United States Patent [19]
Macdonald

[15] 3,673,803
[45] July 4, 1972

[54] METHOD AND APPARATUS FOR SUPPRESSING THE NOISE OF A FAN-JET ENGINE

[72] Inventor: Howard R. Macdonald, San Diego, Calif.
[73] Assignee: Rohr Corporation, Chula Vista, San Diego County, Calif.
[22] Filed: Oct. 6, 1969
[21] Appl. No.: 863,796

[52] U.S. Cl. .............................. 60/226 R, 60/263, 60/264, 60/271, 181/33 HB, 181/33 HC, 239/127.3
[51] Int. Cl. ......................................................... F02k 1/26
[58] Field of Search .......................... 60/226, 263, 264, 271; 239/265.11, 127.3; 181/33.221, 33.222

[56] References Cited

UNITED STATES PATENTS

| | | | |
|---|---|---|---|
| 2,501,633 | 3/1950 | Price | 60/262 |
| 2,588,532 | 3/1952 | Johnson | 60/262 |
| 2,997,845 | 8/1961 | Oulianoff | 181/33 H |
| 3,061,038 | 10/1962 | Lawler | 181/33 H |
| 3,113,428 | 12/1963 | Colley | 181/33 H |
| 3,299,639 | 1/1967 | Lagelbauer | 60/226 |

Primary Examiner—Douglas Hart
Attorney—George E. Pearson

[57] ABSTRACT

A tubular housing is disposed in spaced relation around the casing of a fan-jet engine and is coterminous with the aft end thereof, fan air of said engine being discharged to the atmosphere through the annular gap between the housing and the casing. A lobed thrust nozzle is mounted on the aft end of the engine casing and extends rearwardly therefrom in coaxial relation therewith. Exhaust gas is discharged through the lobes of the nozzle and thus enters the atmosphere in separate streams spaced apart circumferentially of the aft end of said nozzle, and a portion of the fan air flows between the lobes of the nozzle and into the spaces between the streams of exhaust gas.

3 Claims, 2 Drawing Figures

PATENTED JUL 4 1972

3,673,803

INVENTOR.
HOWARD R. MACDONALD
BY
Edwin D. Grant
ATTORNEY 3,673,803

METHOD AND APPARATUS FOR SUPPRESSING THE NOISE OF A FAN-JET ENGINE

SUMMARY OF THE INVENTION

This invention relates to jet-propelled aircraft and more particularly to a method and apparatus for reducing the noise created by aircraft having engines of the fan-jet type.

Part of the noise associated with the operation of jet-propelled aircraft results from the flow through the atmosphere of the high velocity exhaust gas discharged from the engine, or engines, of such aircraft. The amount of sound energy so generated by streams of exhaust gas depends upon the temperature and velocity thereof. The present invention provides for the rapid mixing of the high velocity, high temperature primary exhaust stream of a fan-jet engine with the relatively lower velocity, low temperature fan air of said engine, which mixing is effected by a novel arrangement of a lobed thrust nozzle and a housing which encloses the fan-jet engine on which said nozzle is mounted. More particularly, in accordance with this invention a tubular housing is disposed in concentric, spaced relation around the turbine casing of a fan-jet engine, the aft ends of said housing and said casing being coterminous and fan air of said engine being discharged to the atmosphere through the gap between said housing and casing. A corrugated, or lobed, thrust nozzle is mounted on the aft end of the casing and extends rearwardly therefrom in coaxial relation with said casing and housing. The corrugations which form the lobes of the nozzle extend axially of the latter and gradually increase in depth in the downstream direction so that the forward edge of the nozzle is circular to match the aft edge of the casing and the aft edge thereof is convoluted, with the inner portions of the convoluted aft edge of the nozzle preferably being attached to a tear-shaped plug. A conical plug is also preferably coaxially disposed in the forward portion of the throat of the nozzle and is secured at its base to the aft end of the engine. Exhaust gas of the engine is discharged from the engine casing into the annular space bounded by the forward portion of the nozzle wall and the surface of the conical plug, and as the exhaust gas travels rearwardly through the nozzle it is divided into a plurality of streams which respectively flow through the passages bounded by the surface of the tear-shaped plug and the inner surfaces of the nozzle lobes. Hence the exhaust gas is discharged to the surrounding atmosphere in the streams spaced apart circumferentially of the aft end of the nozzle, and a portion of the fan air which is discharged from the gap between the housing and the engine casing flows between the lobes of the nozzle and thence between the streams of exhaust gas discharged from the latter. There is consequently rapid and thorough mixing of cool fan air with the hot, high velocity exhaust gas immediately downstream from the nozzle exit, which suppresses the noise of operation of the fan-jet engine.

DETAILED DESCRIPTION

Figure 2:
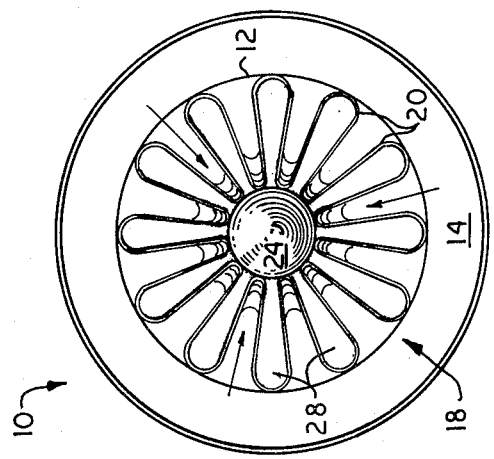
FIG. 2 is a rear view of the same embodiment.

As illustrated in the drawings, a preferred embodiment of the present invention comprises a tubular housing, or nacelle, which is generally designated by the number 10 and which is disposed in concentric, spaced relation around the turbine casing 12 of a fan-jet engine. The space 14 between housing 10 and casing 12 is connected with the fan section of the engine by means of ducts (not shown) so that it serves as a passage for the flow of fan air (represented by single-headed arrows in the drawing) to the atmosphere surrounding the housing. The aft edge 16 of the housing lies in a plane which is perpendicular to the longitudinal axis of the engine therein and which also includes the aft edge of casing 12.

Mounted on the aft end of the engine in coaxial relation therewith is a corrugated thrust nozzle, generally designated by the number 18. At its forward end nozzle 16 is circular in cross-section so that it matches the aft end of casing 12, but the wall of the nozzle is formed with a plurality of longitudinally extending, circumferentially spaced corrugations which begin at a point near the forward end of the nozzle and extend to the aft end thereof, thus forming a plurality of longitudinally extending, radially projecting lobes 20 on said nozzle. The valleys between the lobes gradually increase in depth in the downstream direction, and the innermost portions 22 of the nozzle wall converge toward and are fixedly secured to a tear-shaped plug 24 which is coaxial with the nozzle. In the illustrated embodiment the crests of lobes 20 are the same distance from the longitudinal axis of the nozzle along the entire length of said nozzle. However, in other embodiments of the invention the crests of the lobes may either diverge from, or converge, toward, the longitudinal axis of the nozzle. The illustrated embodiment also comprises a conical plug 26 the base of which is mounted on the aft end bearing housing 28 of the engine and which may be omitted in some forms of the invention (as is also the case with respect to plug 24).

OPERATION

Figure 1:
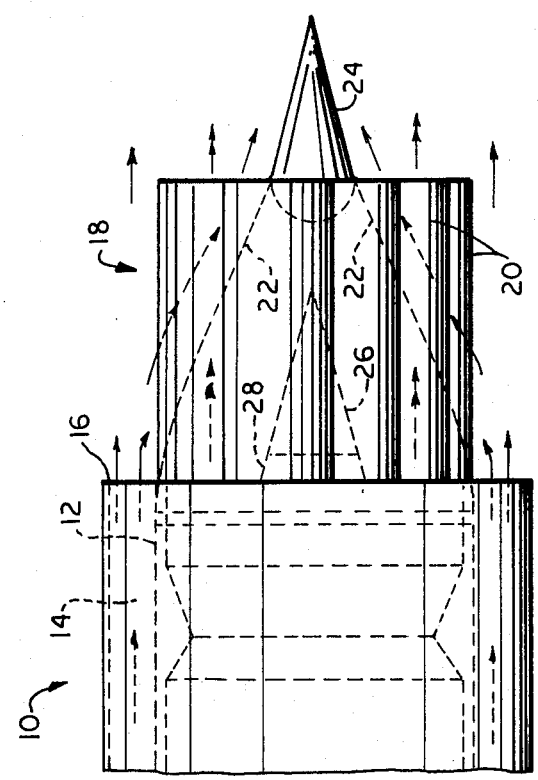
FIG. 1 is a side elevation of a preferred embodiment of this invention, the drawing illustrating in solid lines the rear portion of a housing which envelops a fan-jet engine and a thrust nozzle attached to the aft end of said engine, and illustrating in broken lines components which are disposed within said housing and nozzle.

As illustrated by double-headed arrows in FIG. 1, exhaust gas of the fan-jet engine within housing 10 is discharged into the forward, cylindrical end of nozzle 18 and is divided into separate streams which respectively flow through the passages 28 (see FIG. 2) bounded by the inner surfaces of lobes 20 of said nozzle and then into the surrounding atmosphere.

Fan air, which is represented by single-headed arrows in FIGS. 1 and 2, flows to the atmosphere from the space 14 between housing 10 and casing 12, and a portion thereof flows inwardly along the valleys between lobes 20 and thence between the streams of exhaust gas issuing from said lobes. Some of the slipstream flowing along the outer surface of the housing also flows inwardly between the lobes of the nozzle. Thus there is rapid and thorough mixing of air with exhaust gas at the exit of nozzle 18, which suppresses the noise of the exhaust gas stream for the reasons stated hereinbefore.

As has been pointed out hereinbefore, various changes and modifications can be made in the described and illustrated apparatus without departing from the concept of the invention. Hence the scope of the invention should be considered to be limited only by the terms of the claims appended hereto.

What is claimed as new and useful and desired to be secured by U. S. Letters Patent is:

1. In a jet propulsion plant having a fan-jet engine issuing fan air and exhaust gas separately, the combination comprising:

a casing for said engine having a downstream and a tubular housing having a downstream end and disposed in spaced relation around the casing to form an annular passage therebetween, the downstream ends of said casing and housing being substantially in the same transverse plane and the fan air of said engine being discharged to the surrounding atmosphere from said annular passage, a lobed thrust nozzle mounted on said downstream end of said casing and extending rearwardly therefrom in coaxial relation therewith, said nozzle being corrugated to form internal lobes therein for the passage of the engine exhaust gas therethrough and into the surrounding atmosphere in separate streams spaced apart circumferentially of the downstream end of the nozzle, the external surface of the corrugated nozzle being exposed to the surrounding atmosphere and having valleys therein between said lobes, said lobes and said valleys extending axially of the nozzle, said valleys increasing in depth in the downstream direction and said lobes increasing in radial dimension in the downstream direction whereby a portion of said discharged fan air flows through said valleys and thence between said streams of exhaust gas.

2. The combination defined in claim 1 including a conical plug coaxially disposed within said nozzle and attached at its base to said downstream end of said engine casing.

3. The combination defined in claim 1 a tear-shaped plug coaxially disposed at said terminal end of said nozzle and the rounded end of which is secured to the inner portions of the lobes thereof.

* * * * *